US012133201B2

(12) United States Patent
Agiwal

(10) Patent No.: US 12,133,201 B2
(45) Date of Patent: Oct. 29, 2024

(54) METHOD AND APPARATUS FOR HANDLING CONFIGURED GRANT RESOURCES FOR SMALL DATA TRANSMISSION IN WIRELESS COMMUNICATION SYSTEM

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 298 days.

(21) Appl. No.: 17/541,799

(22) Filed: Dec. 3, 2021

(65) Prior Publication Data

US 2022/0201659 A1   Jun. 23, 2022

(30) Foreign Application Priority Data

Dec. 21, 2020 (KR) .................. 10-2020-0179973

(51) Int. Cl.
*H04W 72/04* (2023.01)
*H04W 72/23* (2023.01)
*H04W 76/27* (2018.01)

(52) U.S. Cl.
CPC .......... *H04W 72/04* (2013.01); *H04W 72/23* (2023.01); *H04W 76/27* (2018.02)

(58) Field of Classification Search
None
See application file for complete search history.

(56) References Cited

U.S. PATENT DOCUMENTS

| | | |
|---|---|---|
| 2016/0249155 A1 | 8/2016 | Anev et al. |
| 2018/0332462 A1 | 11/2018 | Kim et al. |
| 2021/0307055 A1 | 9/2021 | Tsai et al. |
| 2021/0337625 A1* | 10/2021 | Tsai ...................... H04W 76/30 |
| 2021/0410181 A1* | 12/2021 | Jeon .................. H04W 72/1268 |
| 2022/0039146 A1* | 2/2022 | Lei ......................... H04W 72/23 |
| 2022/0039147 A1* | 2/2022 | Lei ........................... H04W 8/24 |
| 2022/0078875 A1* | 3/2022 | Ou ......................... H04W 76/27 |
| 2022/0086899 A1* | 3/2022 | Shih ...................... H04L 5/0044 |
| 2022/0086946 A1* | 3/2022 | Huang .................. H04W 72/23 |

(Continued)

FOREIGN PATENT DOCUMENTS

EP   4 104 612   12/2022

OTHER PUBLICATIONS

Mediatek Inc., 'CG-based SDT', R2-2009057, 3GPP TSG-RAN WG2 #112-e, E-meeting, Oct. 23, 2020, sections 1, 2.4, and figure 3.

(Continued)

*Primary Examiner* — Clemence S Han
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A method and an apparatus for handling configured grant (CG) resource for small data transmission (SDT) are provided.

20 Claims, 7 Drawing Sheets

(56) References Cited

U.S. PATENT DOCUMENTS

| | | | |
|---|---|---|---|
| 2022/0095410 A1* | 3/2022 | Shih | H04W 74/0833 |
| 2023/0189213 A1* | 6/2023 | Kim | H04W 72/04 |
| | | | 455/458 |
| 2023/0379815 A1* | 11/2023 | Wang | H04W 48/20 |
| 2023/0389081 A1* | 11/2023 | Singh | H04W 74/04 |
| 2023/0389117 A1* | 11/2023 | Laselva | H04W 76/27 |
| 2023/0403703 A1* | 12/2023 | Kiilerich Pratas | H04W 24/02 |
| 2024/0015689 A1* | 1/2024 | Tseng | H04W 74/0833 |

OTHER PUBLICATIONS

Apple, 'Control plane aspects on the SDT procedure', R2-2009491, 3GPP TSG-RAN WG2 Meeting #112-e, Online, Oct. 23, 2020, section 2.2.

Oppo, 'Discussion on CG-based SDT', R2-2009015, 3GPP TSG-RAN WG2 #112-e, E-meeting, Oct. 23, 2020, sections 2.1-2.3, Oct. 23, 2020.

International Search Report and Written Opinion dated Mar. 8, 2022, issued in International Patent Application No. PCT/KR2021/018295.

NEC; Discussion on CG-based Small Data Transmissions; 3GPP TSG-RAN WG2 Meeting #112 electronic; R2-2009973; XP052363017; Online; Nov. 2-13, 2020; Oct. 23, 2020.

Email Discussion Rapporteur (ZTE Corpoation); Agreeable details of RRC-based solution for SDT (RACH and CG); 3GPP TSG-RAN2 Meeting #112-e; R2-2009189, XP052362243; e-Meeting; Nov. 2-13, 2020; Oct. 22, 2020.

3GPP; 3rd Generation Partnership Project; Technical Specification Group Radio Access Network; NR; Radio Resource Control (RCC) protocol specification (Release 16); 3GPP TS38.331; V16.2.0; (Sep. 2020); pp. 1-921; XP051961610; Oct. 7, 2020; Valbonne, France.

Extended European Search Report dated Mar. 19, 2024; European Appln No. 21911312.3-1215 / 4248701 PCT/KR2021018295.

* cited by examiner

METHOD AND APPARATUS FOR HANDLING CONFIGURED GRANT RESOURCES FOR SMALL DATA TRANSMISSION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0179973, filed on Dec. 21, 2020, in the Korean Intellectual Property Office, the disclosure of which is incorporated by reference herein in its entirety.

BACKGROUND

1. Field

The disclosure relates to a wireless communication system. More particularly, the disclosure relates to an apparatus, a method and a system for handling configured grant (CG) resources for small data transmission (SDT) in wireless communication system.

2. Description of Related Art

To meet the demand for wireless data traffic having increased since deployment of 4th generation (4G) communication systems, efforts have been made to develop an improved 5$^{th}$ generation (5G) or pre-5G communication system. Therefore, the 5G or pre-5G communication system is also called a 'Beyond 4G Network' or a 'Post Long-Term Evolution (LTE) System'. The 5G communication system is considered to be implemented in higher frequency (millimeter (mm) Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, there are needs to enhance small data transmission (SDT) procedure for next generation wireless communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

In accordance with an aspect of the disclosure, a method performed by a terminal is provided. The method includes receiving, from a base station, a first radio resource control (RRC) message including suspend configuration information and configured grant (CG) resource information for a small data transmission (SDT), transmitting, to the base station while the terminal is in an RRC inactive state based on the suspend configuration information, first uplink data of the SDT by using a CG resource associated with the CG resource information, receiving, from the base station, a second RRC message including information indicating to the terminal whether to continue to use the CG resource, and transmitting, to the base station, second uplink data of the SDT by using the CG resource associated with the CG resource information, in case that the information indicates the terminal to use the CG resource, wherein the CG resource is not released after a completion of a transmission of the first uplink data of the SDT, in case that the information indicates the terminal to use the CG resource.

In accordance with another aspect of the disclosure, a method performed by a base station is provided. The method includes transmitting, to a terminal, a first radio resource control (RRC) message including suspend configuration information configuring an RRC inactive state for the terminal and configured grant (CG) resource information for a small data transmission (SDT), receiving, from the terminal in the RRC inactive state, first uplink data of the SDT by using a CG resource associated with the CG resource information, transmitting, to the terminal, a second RRC message including information indicating to the terminal whether to continue to use the CG resource, and receiving, from the terminal, second uplink data of the SDT by using the CG resource associated with the CG resource information, in case that the information indicates the terminal to use the CG resource, wherein the CG resource is not released after a completion of a reception of the first uplink data of the SDT, in case that the information indicates the terminal to use the CG resource.

In accordance with another aspect of the disclosure, a terminal is provided. The terminal includes a transceiver configured to transmit or receive a signal, and a controller configured to receive, from a base station, a first radio resource control (RRC) message including suspend configuration information and configured grant (CG) resource information for a small data transmission (SDT), transmit, to the base station while the terminal is in an RRC inactive state based on the suspend configuration information, first uplink data of the SDT by using a CG resource associated with the CG resource information, receive, from the base station, a second RRC message including information indicating to the terminal whether to continue to use the CG resource, and transmit, to the base station, second uplink data of the SDT by using the CG resource associated with the CG resource information, in case that the information indicates the terminal to use the CG resource, wherein the CG resource is not released after a completion of a transmission of the first uplink data of the SDT, in case that the information indicates the terminal to use the CG resource.

In accordance with another aspect of the disclosure, a base station is provided. The base station includes a transceiver configured to transmit or receive a signal, and a controller configured to transmit, to a terminal, a first radio resource control (RRC) message including suspend configuration information configuring an RRC inactive state for the terminal and configured grant (CG) resource information for a small data transmission (SDT), receive, from the terminal in the RRC inactive state, first uplink data of the SDT by using a CG resource associated with the CG resource information, transmit, to the terminal, a second RRC message including information indicating to the terminal whether to continue to use the CG resource, and receive, from the terminal, second uplink data of the SDT by using the CG resource associated with the CG resource information, in case that the information indicates the terminal to use the CG resource, wherein the CG resource is not released after a completion of a reception of the first uplink data of the SDT, in case that the information indicates the terminal to use the CG resource.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
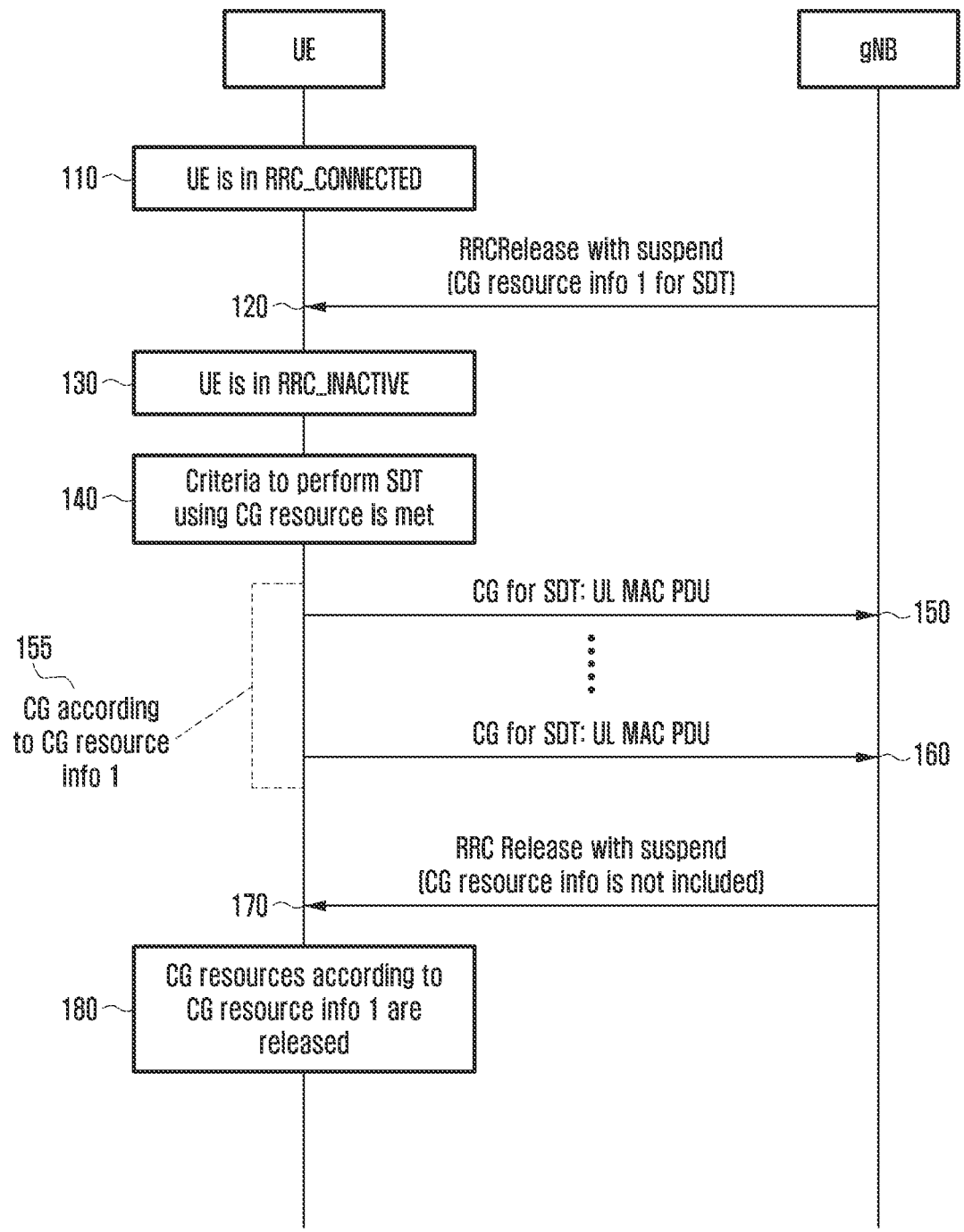
FIG. 1 illustrates an example of configured grant (CG) resource handling according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB.

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few examples use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, UE and gNB communicates with each other using Beamforming Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas.

In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal.

By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming A receiver can also make plurality of RX beam patterns of different directions. Each of these receive patterns can be also referred as RX beam.

The fifth generation wireless communication system (also referred as next generation radio or NR), supports stand-alone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in radio resource control connected (RRC_CONNECTED) is configured to utilize radio resources provided by two distinct schedulers, located in two different nodes connected via a non-ideal backhaul and providing either E-UTRA (Evolved Universal Mobile Telecommunications System (UMTS) Terrestrial Radio Access) (i.e. if the node is an ng-eNB) or NR access (i.e. if the node is a gNB). In NR for a UE in RRC_CONNECTED not configured with carrier aggregation (CA)/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the Primary Cell (Pcell) and optionally one or more Secondary Cells (Scells). In NR the term Secondary Cell Group (SCG) refers to a group of serving cells associated with the Secondary Node, comprising of the Primary SCG Cell (PSCell) and optionally one or more S cells. In NR Pcell refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. PSCell refers to a serving cell in SCG in which the UE performs random access when performing the Reconfiguration with Sync procedure. For Dual Connectivity operation the term SpCell (i.e. Special Cell) refers to the Pcell of the MCG or the PSCell of the SCG, otherwise the term Special Cell refers to the Pcell.

In the fifth generation wireless communication system (or NR), Physical Downlink Control Channel (PDCCH) is used to schedule downlink (DL) transmissions on Physical Downlink Shared Channel (PDSCH) and uplink (UL) transmissions on Physical Uplink Shared Channel (PUSCH), where the Downlink Control Information (DCI) on PDCCH includes: Downlink assignments containing at least modulation and coding format, resource allocation, and hybrid automatic repeat request (HARQ) information related to downlink shared channel (DL-SCH); Uplink scheduling grants containing at least modulation and coding format, resource allocation, and hybrid-ARQ information related to uplink shared channel (UL-SCH). In addition to scheduling, PDCCH can be used to for: Activation and deactivation of configured PUSCH transmission with configured grant; Activation and deactivation of PDSCH semi-persistent transmission; Notifying one or more Ues of the slot format; Notifying one or more Ues of the physical resource block(s) (PRB(s)) and orthogonal frequency division multiplexing (OFDM) symbol(s) where the UE may assume no transmission is intended for the UE; Transmission of transmission power control (TPC) commands for Physical Uplink Control Channel (PUCCH) and PUSCH; Transmission of one or more TPC commands for sounding reference signal (SRS) transmissions by one or more Ues; Switching a UE's active bandwidth part; Initiating a random access procedure.

A UE monitors a set of PDCCH candidates in the configured monitoring occasions in one or more configured Control Resource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In NR, a list of search space configurations are signaled by gNB for each configured bandwidth part (BWP) wherein each search configuration is uniquely identified by an identifier. Identifier of search space configuration to be used for specific purpose such as paging reception, system information (SI) reception, random access response (RAR) reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the Equation 1 below:

$$(y*(\text{number of slots in a radio frame})+x-\text{Monitoring-offset-PDCCH-slot})\mod(\text{Monitoring-periodicity-PDCCH-slot})=0; \quad \text{Equation 1}$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of CORESET configuration associated with it. A list of CORESET configurations are signaled by gNB for each configured BWP wherein each CORESET configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported subcarrier spacing (SCS) is pre-defined in NR. Each CORESET configuration is associated with a list of Transmission configuration indicator (TCI) states. One DL reference signal (RS) identifier (ID) (SSB or channel state information reference signal (CSI-RS)) is configured per TCI state. The list of TCI states corresponding to a CORESET configuration is signaled by gNB via RRC signaling. One of the TCI state in TCI state list is activated and indicated to UE by gNB. TCI state indicates the DL TX beam (DL TX beam is quasi-collocated (QCLed) with SSB/CSI RS of TCI state) used by GNB for transmission of PDCCH in the PDCCH monitoring occasions of a search space.

In NR bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP).

BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. Pcell or Scell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the medium access control (MAC) entity itself upon initiation of Random Access procedure. Upon addition of SpCell or activation of an Scell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the fifth generation wireless communication system, RRC can be in one of the following states: RRC_IDLE, RRC_INACTIVE, and RRC_CONNECTED. A UE is either in RRC_CONNECTED state or in RRC_INACTIVE state when an RRC connection has been established. If this is not the case, i.e. no RRC connection is established, the UE is in RRC_IDLE state. The RRC states can further be characterized as follows:

In the RRC_IDLE, a UE specific discontinuous (DRX) may be configured by upper layers. The UE monitors Short Messages transmitted with paging RNTI (P-RNTI) over DCI; monitors a Paging channel for CN paging using 5G-S-temporary mobile subscriber identity (5G-S-TMSI); performs neighboring cell measurements and cell (re-)selection; acquires system information and can send SI request (if configured); performs logging of available measurements together with location and time for logged measurement configured Ues.

In RRC_INACTIVE, a UE specific DRX may be configured by upper layers or by RRC layer; UE stores the UE Inactive AS context; a RAN-based notification area is configured by RRC layer. The UE monitors Short Messages transmitted with P-RNTI over DCI; monitors a Paging channel for CN paging using 5G-S-TMSI and RAN paging using fullI-RNTI; performs neighboring cell measurements and cell (re-)selection; performs RAN-based notification area updates periodically and when moving outside the configured RAN-based notification area; acquires system information and can send SI request (if configured); performs logging of available measurements together with location and time for logged measurement configured Ues.

In the RRC_CONNECTED, the UE stores the AS context and transfer of unicast data to/from UE takes place. The UE monitors Short Messages transmitted with P-RNTI over DCI, if configured; monitors control channels associated with the shared data channel to determine if data is scheduled for it; provides channel quality and feedback information; performs neighboring cell measurements and measurement reporting; acquires system information.

In the RRC_CONNECTED, network may initiate suspension of the RRC connection by sending RRCRelease with suspend configuration. When the RRC connection is suspended, the UE stores the UE Inactive AS context and any configuration received from the network, and transits to RRC_INACTIVE state. If the UE is configured with SCG, the UE releases the SCG configuration upon initiating a RRC Connection Resume procedure. The RRC message to suspend the RRC connection is integrity protected and ciphered.

The resumption of a suspended RRC connection is initiated by upper layers when the UE needs to transit from RRC_INACTIVE state to RRC_CONNECTED state or by RRC layer to perform a RAN based notification area (RNA) update or by RAN paging from NG-RAN. When the RRC connection is resumed, network configures the UE according to the RRC connection resume procedure based on the stored UE Inactive AS context and any RRC configuration received from the network. The RRC connection resume procedure re-activates AS security and re-establishes signaling radio bearer(s) (SRB(s)) and data radio bearer(s) (DRB(s)). In response to a request to resume the RRC connection, the network may resume the suspended RRC connection and send UE to RRC_CONNECTED, or reject the request to resume and send UE to RRC_INACTIVE (with a wait timer), or directly re-suspend the RRC connection and send UE to RRC_INACTIVE, or directly release the RRC connection and send UE to RRC_IDLE, or instruct the UE to initiate NAS level recovery (in this case the network sends an RRC setup message).

Upon initiating the resume procedure, UE:
apply the default L1 parameter values as specified in corresponding physical layer specifications, except for the parameters for which values are provided in SIB1;
apply the default medium access control (MAC) Cell Group configuration
apply the common control channel (CCCH) configuration
start timer T319;
apply the timeAlignmentTimerCommon included in SIB1
apply the default SRB1 configuration
set the variable pending RNA-Update to false;
initiate transmission of the RRCResumeRequest message or RRCResumeRequest1
restore the RRC configuration, RoHC state, the stored QoS flow to DRB mapping rules and the KgNB and $K_{RRCint}$ keys from the stored UE Inactive AS context except for the following:
masterCellGroup;
mrdc-SecondaryCellGroup, if stored; and
pdcp-Config;
set the resumeMAC-I to the 16 least significant bits of the MAC-I calculated:
over the ASN.1 encoded as per clause 8 (i.e., a multiple of 8 bits) VarResumeMAC-Input;
with the KRRCint key in the UE Inactive AS Context and the previously configured integrity protection algorithm; and
with all input bits for COUNT, BEARER and DIRECTION set to binary ones;

derive the KgNB key based on the current KgNB key or the NH, using the stored nextHopChainingCount value;

derive the $K_{RRCenc}$ key, the $K_{RRCint}$ key, the $K_{Upint}$ key and the $K_{Upenc}$ key;

configure lower layers to apply integrity protection for all signaling radio bearers except SRB0 using the configured algorithm and the $K_{RRCint}$ key and $K_{Upint}$ key, i.e., integrity protection shall be applied to all subsequent messages received and sent by the UE;

configure lower layers to apply ciphering for all signaling radio bearers except SRB0 and to apply the configured ciphering algorithm, the $K_{RRCenc}$ key and the $K_{Upenc}$ key derived, i.e. the ciphering configuration shall be applied to all subsequent messages received and sent by the UE;

re-establish packet data convergence protocol (PDCP) entities for SRB1;

resume SRB1;

transmit RRCResumeRequest or RRCResumeRequest1.

Figure 2:
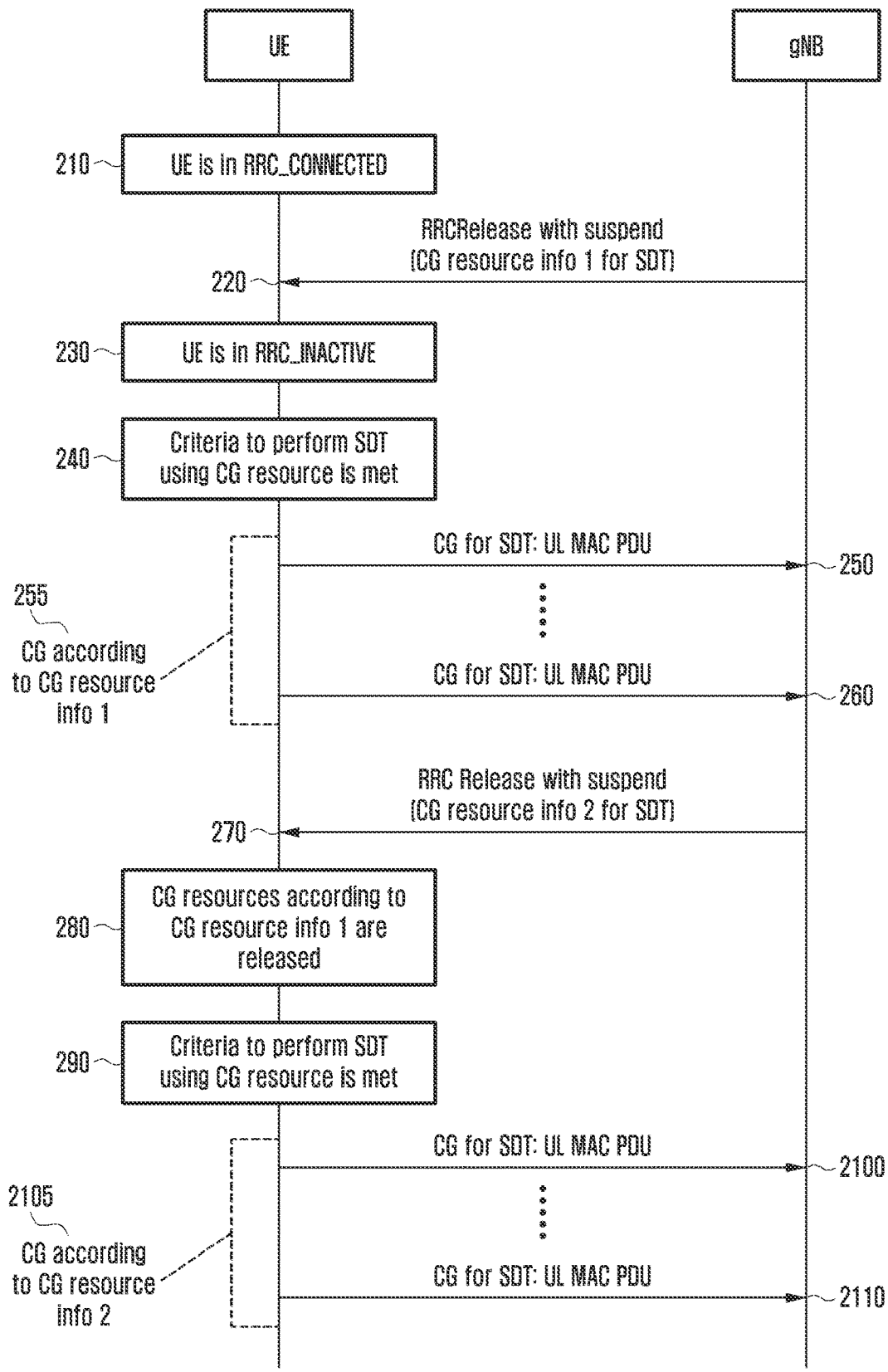
FIG. 2 illustrates another example of CG resource handling according to an embodiment of the disclosure.

FIGS. 1 and 2 illustrate examples of configured grant (CG) resource handling according to various embodiments of the disclosure.

In the 5G wireless communication system, for small data transmission (SDT) in RRC_INACTIVE, UE can be configured with preconfigured UL resources (also referred as CG resources or CG type 1 resources). FIGS. 1 and 2 are example illustrations of SDT procedure using CG resources. UE in RRC_CONNECTED (110, 210), receives CG resource information for SDT in RRC release message with suspend configuration (i.e., suspendConfig) (120, 220). UE enters RRC_INACTIVE upon receiving RRC release message with suspend configuration (130, 230). In RRC_INACTIVE when the criteria (e.g. data volume threshold, reference signal received power (RSRP) threshold, CG resource validity criteria etc.) to perform SDT using CG resources is met (140, 240), UE uses configured grants indicated by CG resource information (155, 255) and transmits one or more UL MAC protocol data units (PDUs) (150, 160, 250, 260). SDT procedure is terminated upon receiving RRC release message (170, 270). Referring to FIG. 1, if this RRC release message does not include CG resource information (170), CG resource information (i.e. CG resource info 1) previously received is released (180). On the other hand, referring to FIG. 2, if this RRC release message includes new CG resource information (270), CG resource information (i.e. CG resource info 1) previously received is released (280) and new CG resource information (i.e. CG resource info 2) received is used for small data transmission (290, 2100, 2105, 2110).

Thus, CG resources needs to be reconfigured at the time of completion of every SDT procedure, in accordance with current SDT procedure.

Embodiment 1—Small Data Transmission Aspects

UE is in RRC_INACTIVE state. During the RRC_INACTIVE state, UE initiates RRC connection resumption for small data transmission (if criteria to perform small data transmission is met). Upon initiation of RRC connection resumption for small data transmission, UE performs the following operations:

apply the default L1 parameter values as specified in corresponding physical layer specifications, except for the parameters for which values are provided in SIB1;

apply the default MAC Cell Group configuration apply the CCCH configuration start timer (T319 or a new timer configured by gNB for small data transmission);

apply the timeAlignmentTimerCommon included in SIB1 apply the default SRB1 configuration set the variable pendingRNA-Update to false;

initiate transmission of the RRCResumeRequest message or RRCResumeRequest1 if field useFullResumeID is signaled in SIB1: select RRCResumeRequest1 as the message to use; set the resumeIdentity to the stored fullI-RNTI value;

else: select RRCResumeRequest as the message to use; set the resumeIdentity to the stored shortI-RNTI value;

restore the RRC configuration, RoHC state, the stored QoS flow to DRB mapping rules and the $K_{gNB}$ and $K_{RRCint}$ keys from the stored UE Inactive AS context except for the following: masterCellGroup; mrdc-SecondaryCellGroup, if stored; and pdcp-Config;

set the resumeMAC-I to the 16 least significant bits of the MAC-I calculated:
  over the ASN.1 encoded VarResumeMAC-Input
  with the KRRCint key in the UE Inactive AS Context and the previously configured integrity protection algorithm; and
  with all input bits for COUNT, BEARER and DIRECTION set to binary ones;

derive the $K_{gNB}$ key based on the current $K_{gNB}$ key or the NH, using the stored nextHopChainingCount value;

derive the $K_{RRCenc}$ key, the $K_{RRCint}$ key, the $K_{Upint}$ key and the $K_{Upenc}$ key;

configure lower layers to apply integrity protection for all radio bearers except SRB0 using the configured algorithm and the $K_{RRCint}$ key and $K_{Upint}$ key, i.e., integrity protection shall be applied to all subsequent messages and user data received and sent by the UE; Only DRBs with previously configured UP integrity protection shall resume integrity protection.

configure lower layers to apply ciphering for all radio bearers except SRB0 and to apply the configured ciphering algorithm, the $K_{RRCenc}$ key and the $K_{Upenc}$ key derived, i.e. the ciphering configuration shall be applied to all subsequent messages and data received and sent by the UE;

re-establish PDCP entities for all SRBs and all DRBs (or re-establish PDCP entities for SRB1 and all DRBs) or re-establish PDCP entities for SRB1 and other RBs (SRB2, DRBs) for which SDT is enabled, the RBs for which SDT is enabled can be signaled by gNB in RRCRelease message;

re-establish RLC entities for DRBs (note that RLC entities for SRB1 is re-established when UE enters inactive state) or re-establish RLC entities for RBs (SRB2, DRBs) for which SDT is enabled, the RBs for which SDT is enabled can be signaled by gNB in RRCRelease message resume all SRBs and all DRBs (or resume SRB1 and all DRBs or resume SRB1 and RBs for which SDT is enabled);

Upon connection resume, at which point of time will PDCP provide dedicated traffic channel (DTCH) service data unit (SDU) to the lower layer, also needs to be specified. RRC can indicate this to PDCP upon resumption of DRBs.

transmit RRCResumeRequest or RRCResumeRequest1. The user data are ciphered and integrity protected (Only for DRBs configured with UP integrity protection) and transmitted on DTCH multiplexed with the RRCResumeRequest/RRCResumeRequest1 message on CCCH. Some assistance information can also be included like buffer status report (BSR) (regular or truncated); or a New MAC CE indicating UE has more UL data or UE expects DL data in response to UL Data and/or including SS-RSRP or channel quality information (CQI); or indication in RRC message indicating UE has more UL data or UE expects DL data in response to UL Data. Note that this transmission is performed in configured grant in case of CG based small data transmission.

In an alternate embodiment, instead of sending RRCResumeRequest or RRCResumeRequest1 together with uplink data, uplink data with integrity protection is transmitted. RRCResumeRequest or RRCResumeRequest1 message is not transmitted. The gNB can authenticate the UE based on received MAC-I together with uplink data. Note that this transmission is performed in configured grant in case of CG based small data transmission.

Instead of resuming all DRBs and re-establishing PDCP/RLC entities for all DRBs in the above operation, UE resumes and re-establishes only those DRBs for which small data transmission is allowed.

The DRBs for which small data transmission is allowed can be signaled by gNB (e.g. in RRCRelease message or any other RRC signaling message). One or more DRB identities of DRBs for which small data transmission is allowed can be included in RRCRelease message.

A DRB is considered as allowed for small data transmission if data from LCH of this DRB is allowed to be transmitted according to LCH restrictions (e.g., allowedSCS-List, maxPUSCH-Duration, configuredGrantType1Allowed, allowedServingCells, allowedCG-List and allowedPHY-PriorityIndex, etc.) in the UL grant for small data transmission. One or more LCH restrictions are configured in LCH configuration of LCH associated with DRB. The allowedSCS-List sets the allowed Subcarrier Spacing(s) for transmission. The maxPUSCH-Duration which sets the maximum PUSCH duration allowed for transmission. The configuredGrantType1Allowed which sets whether a configured grant Type 1 can be used for transmission. The allowedServingCells which sets the allowed cell(s) for transmission. The allowedCG-List which sets the allowed configured grant(s) for transmission. The allowedPHY-PriorityIndex which sets the allowed PHY priority index(es) of a dynamic grant for transmission. For example, if SCS for UL grant for small data transmission is SCS X and LCH for a DRB is configured with allowedSCS-List wherein SCS X is not included in allowedSCS-List, the DRB is not considered for small data transmission.

In RRC_CONNECTED UE reports its capabilities to indicate whether to support Pre-configured PUSCH (i.e., CG) during RRC_INACTIVE. UE may report its preference to configure the Pre-configured PUSCH e.g. in UEAssistanceInformation message. The gNB can decide to configure Pre-configured PUSCH in RRC_INACTIVE based on: at least one of UE capabilities, UE types, UE preference or UL traffic pattern.

UE receives the pre-configured PUSCH resources (e.g. CG Type 1 resources) for SDT in dedicated signaling (RRCReconfiguration message or RRCRelease message) from gNB.

These PUSCH resources for SDT are applicable to cell from which UE has received the RRCRelease message or RRCReconfiguration message including PUSCH resources for SDT. These resources for SDT can also be applicable to multiple cells.

These PUSCH resources are also mapped to synchronization signal block(s) (SSB(s)).

If multiple UL carriers are supported, pre-configured PUSCH resources for SDT are received separately for supplement uplink (SUL) and normal uplink (NUL).

The configuration on Pre-configured PUSCH is provided in RRCRelease. For instance, the configuration can be added when RRCRelease is used to switch to RRC_INACTIVE. The configuration may be added into SuspendConfig IE. Alternately, The ConfiguredGrantConfig on Type 1 is provided in RRCReconfiguration. And, an indicator is included into RRCRelease to indicate if UE can continue to use the configured grant type 1 during RRC_INACTIVE. In addition, additional (Pre-configured PUSCH specific) configuration may be provided in RRCRelease message.

While UE is in RRC_INACTIVE, SDT using pre-configured PUSCH resources is initiated.

UE selects UL carrier.
  If SUL is configured (in the cell where UE is performing SDT i.e. camped cell in RRC_INACTIVE) and the RSRP of the downlink pathloss reference is less than RSRPThresholdSUL-SDT, UE select SUL. Otherwise UE select NUL. RSRPThresholdSUL-SDT is received from gNB. If RSRPThresholdSUL-SDT is not configured, UE uses RSRPThresholdSUL configured in RACH configuration.

UE then select an SSB with SS-RSRP above the RSRPThresholdSSB-SDT amongst the SSBs associated with pre-configured PUSCH resources for SDT on selected UL carrier. RSRPThresholdSSB-SDT is received from gNB. If RSRPThresholdSSB-SDT is not configured, UE uses RSRPThresholdSSB configured in RACH configuration.

UE then select the earliest available UL grant corresponding to selected SSB from the pre-configured PUSCH resources of selected UL carrier.

UE generates MAC PDU for small data transmission and transmit in the selected UL grant. The UE transmits its small data by using one of the following options:
  RRCResumeRequest (or new RRC message)+uplink data (on DTCH). resumeIdentity, ResumeMAC-I, resumeCause in RRCResumeRequest/RRCResumeRequest1. New resumeCause can be introduced to indicate the small data transmission or small data transmission via pre-configured PUSCH.
  RRCResumeRequest (or new RRC message). resumeIdentity, ResumeMAC-I, resumeCause, NAS container in RRCResumeRequest/RRCResumeRequest1. NAS container includes UL data.
  new MAC CE (resumeIdentity, ResumeMAC-I)+uplink data (on DTCH). resumeIdentity is provided for UE identification purpose. ResumeMAC-I is for security.

Figure 3:
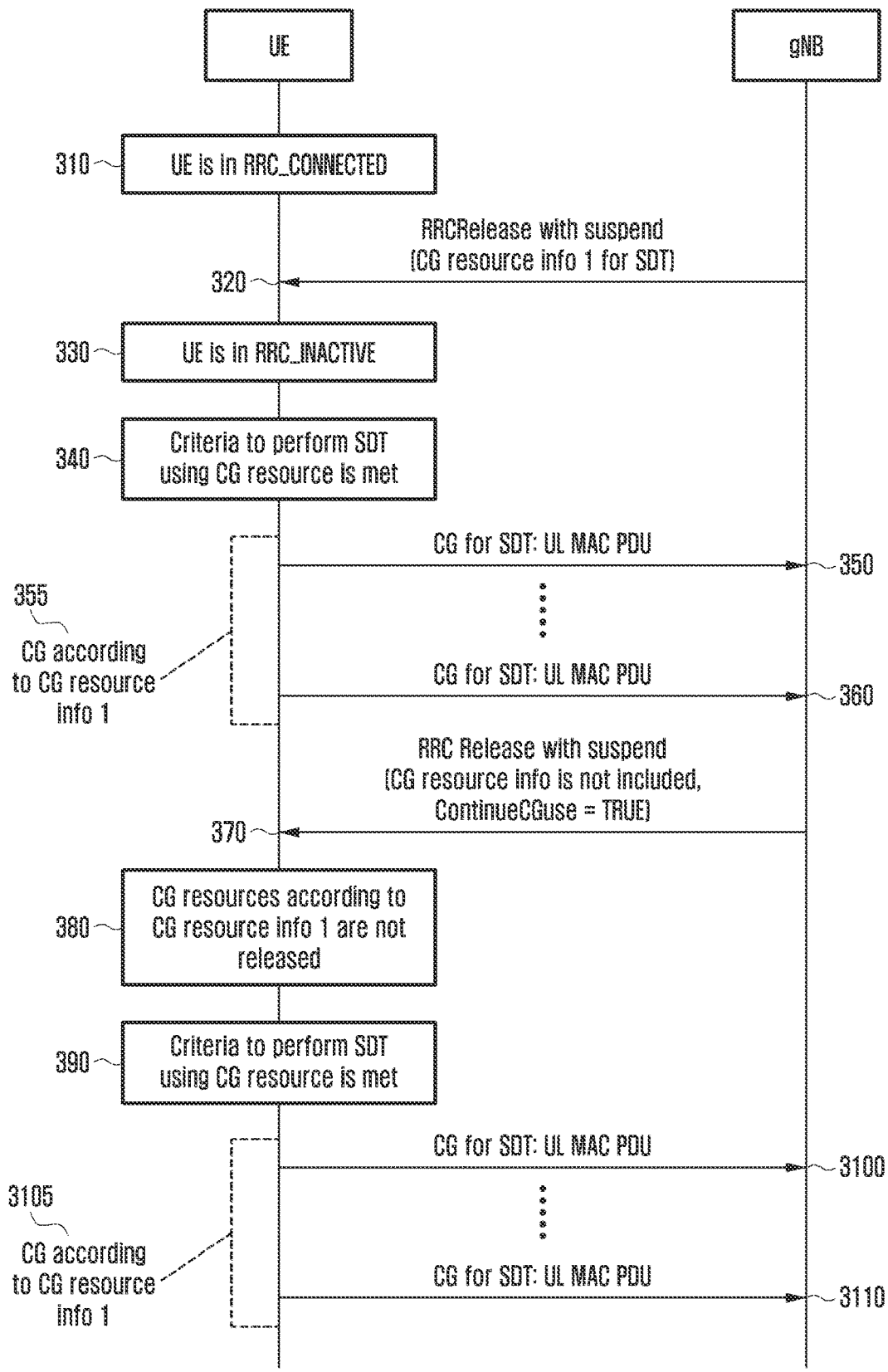
FIG. 3 illustrates another example of CG resource handling according to an embodiment of the disclosure.

To overcome the issue of configuring CG resources again at the time of completion of every SDT procedure, a new indication is introduced in RRC Release message. This indication indicates whether UE should continue using the previously configured CG resources for SDT or not. This indication can be included when CG resource configuration is not included in RRC Release message. FIG. 3 is an example illustration of usage of this new indication. FIG. 3 illustrates another example of CG resource handling according to an embodiment of the disclosure.

Referring to FIG. 3, UE in RRC_CONNECTED (310), receives CG resource information (CG resource info 1) for small data transmission in RRC release message with suspend configuration (320). UE enters RRC_INACTIVE upon receiving RRC release message with suspend configuration (330). In RRC_INACTIVE when the criteria (e.g. data volume threshold, RSRP threshold, etc.) to perform SDT is met (340), UE initiates SDT procedure and performs operation as explained earlier. UE uses configured grants indicated by CG resource information (CG resource info 1) and transmits one or more UL MAC PDUs (355, 350, 360). SDT procedure is terminated upon receiving RRC release message (370). Referring to FIG. 3, the RRC release message does not include CG resource information (370). It includes the proposed indication (i.e., ContinueCGuse sets to TRUE) to continue using previously configured CG resources. So, the UE does not release CG resource information (i.e. CG resource info 1) previously received (380). UE continue to use the previously configured CG resources for subsequent SDT procedure (390, 3100, 3105, 3110).

In an embodiment, ContinueCGuse sets to TRUE can be included in RRC Release message at 320 which includes CG resource information for SDT. This indicates that RRC Release message later does not include CG resource information for SDT, UE continue to use these CG resources. Upon receiving RRC release message which does not include CG resource information (370), UE continue to use using previously configured CG resources as ContinueCGuse was set to TRUE in RRC release message at 320. If ContinueCGuse was set to FALSE in RRC release message at 320 or if ContinueCGuse was not included in RRC release message at 320, UE will release the CG resource information received at 320 upon receiving RRC release message at 370. The NEED code in ASN.1 signaling for CG resource information 1 in the RRC Release message at 320 can be set to 'M' and in this case operation is same as in case 'ContinueCGuse set to TRUE', i.e. Upon receiving RRC release message which does not include CG resource information (370), UE continue to use using previously configured CG resources.

In an embodiment, the NEED code in ASN.1 signaling for CG resource information 1 in the RRC Release message at 320 can be set to 'R' and in this case operation is same as in case 'ContinueCGuse set to FALSE or ContinueCGuse is not included', i.e. Upon receiving RRC release message which does not include CG resource information (370), UE will release the CG resource information received at 320 upon receiving RRC release message at 370.

In an embodiment, CG resources are valid until an expiry of timer, wherein the timer is started upon receiving configuration of CG resources. The timer is re-started upon receiving indication (ContinueCGuse sets to TRUE) to continue using previously configured CG resources. Alternately, timer is not re-started and continued upon receiving indication (ContinueCGuse sets to TRUE) to continue using previously configured CG resources. UE continues to use the previously configured CG resources for subsequent SDT procedure it timer is running.

Upon receiving RRC release message, SDT procedure (CG based or non CG based) is terminated. UE suspends all SRBs and DRBs except SRB0. UE indicates PDCP suspend to all DRBs (or to the DRBs which were resumed during initiation of SDT procedure). UE resets MAC, and re-establishes RLC entity for SRB1. If NCC was received during SDT procedure, store current security keys, C-RNTI and Cell ID in stored AS context. SDT timer is stopped.

Figure 4:
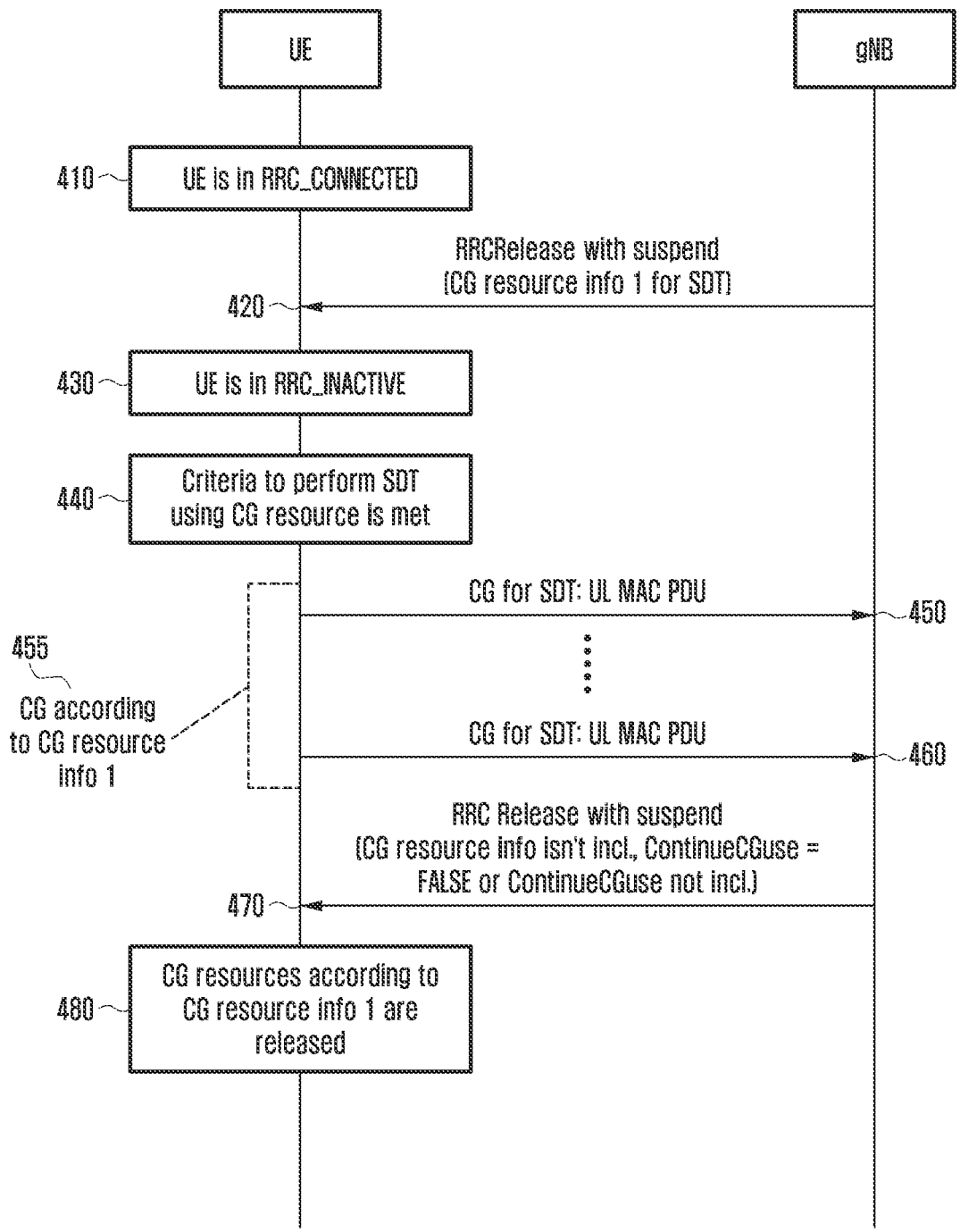
FIG. 4 illustrates another example of CG resource handling according to an embodiment of the disclosure.

FIG. 4 is another example illustration of usage of this new indication. FIG. 4 illustrates another example of CG resource handling according to an embodiment of the disclosure.

Referring to FIG. 4, UE in RRC_CONNECTED (410), receives CG resource information (CG resource info 1) for small data transmission in RRC release message with suspend configuration (420). UE enters RRC_INACTIVE upon receiving RRC release message with suspend configuration (430). In RRC_INACTIVE when the criteria (e.g. data volume threshold, RSRP threshold, etc.) to perform SDT is met (440), UE initiates SDT procedure and performs operation as explained earlier. UE uses configured grants indicated by CG resource information (CG resource info 1) and transmits one or more UL MAC PDUs (455, 450, 460). SDT procedure is terminated upon receiving RRC release message (470). Referring to FIG. 4, an RRC release message does not include CG resource information (470). It also does not include the proposed indication (ContinueCGuse sets to TRUE) to continue using previously configured CG resources. So, the UE release CG resource information (i.e. CG resource info 1) previously received (480).

In an embodiment, CG resources are valid until an expiry of timer, wherein the timer is started upon receiving configuration of CG resources. The timer is stopped if indication (ContinueCGuse sets to TRUE) to continue using previously configured CG resources is not received. Alternately, timer is not stopped and continued if indication (ContinueCGuse sets to TRUE) to continue using previously configured CG resources is not received. UE continue to use the previously configured CG resources for subsequent SDT procedure it timer is running.

CG resources for SDT can be used for initial hybrid automatic repeat request (HARQ) packet transmission and/or HARQ packet retransmission during the SDT procedure. Network can indicate whether CG resources can be used for retransmission or not. Network can indicate whether CG resources can be used for subsequent SDT transmission (i.e. other than first transmission during the SDT procedure) or not. UE can accordingly use the CG resource during the SDT procedure.

Embodiment 2—Other Triggers to Release the CG Resources Configured for SDT

Figure 5:
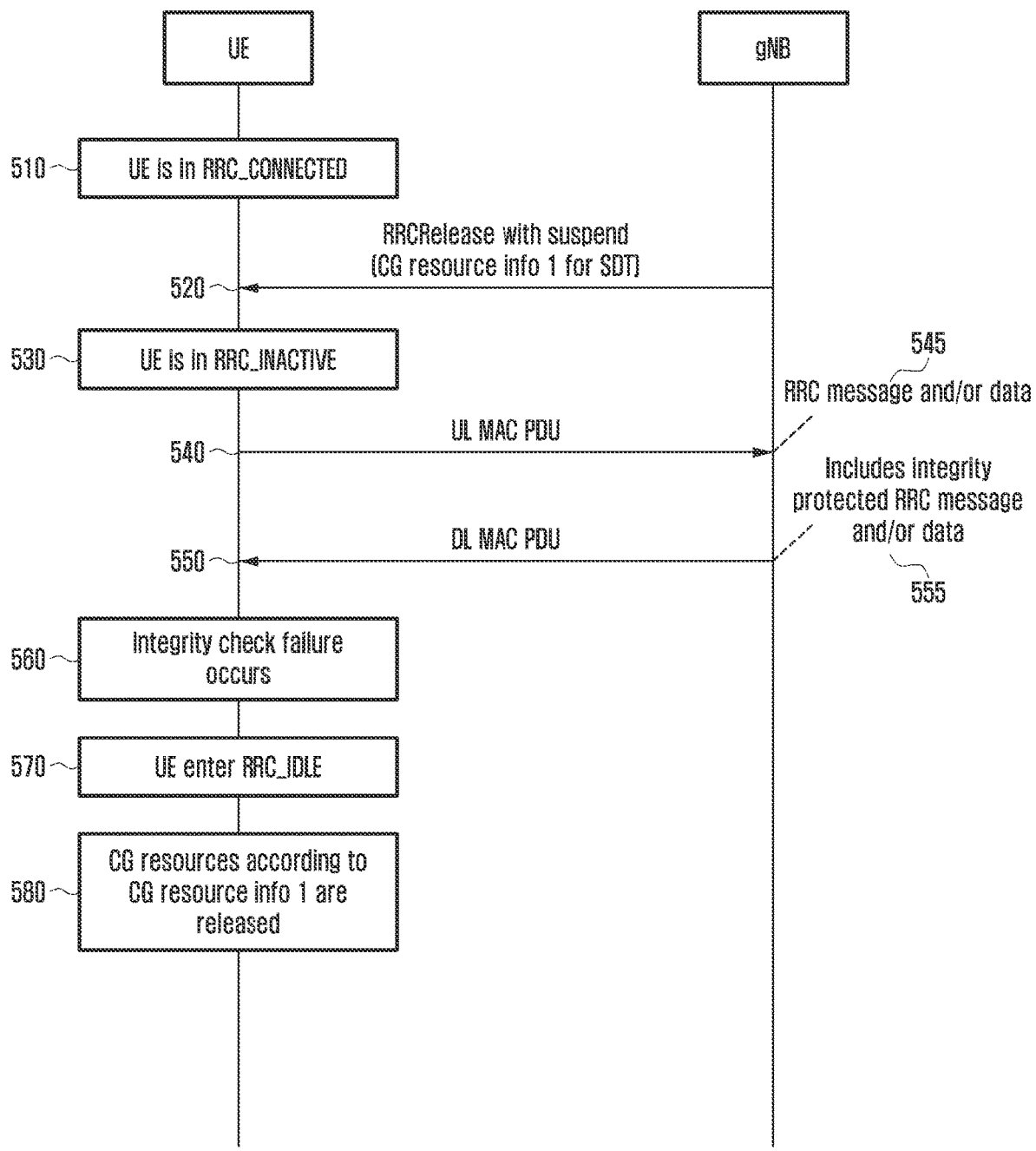
FIG. 5 illustrates another example of CG resource handling according to an embodiment of the disclosure.

FIG. 5 illustrates another example of CG resource handling according to an embodiment of the disclosure.

Embodiment 2-1:

Referring to FIG. 5, an illustration of CG resources release due to integrity check failure is depicted. UE in RRC_CONNECTED (510), receives CG resource information (CG resource info 1) for small data transmission in RRC release message with suspend configuration (520). UE enters RRC_INACTIVE upon receiving RRC release message with suspend configuration (530). During the SDT procedure, UE transmits UL MAC PDU including RRC Message and/or data (540, 545). Also, during the SDT procedure, UE receives DL MAC PDU including integrity protected RRC message or data packet (550, 555). If integrity check failure occurs (MAC-I received does not matches with MAC-I generated by UE) (560), UE releases the CG resources configured for SDT (580). UE enters the RRC_IDLE (570).

Embodiment 2-2:
UE is in RRC_CONNECTED.
UE receives RRCRelease with suspend indication.
Includes CG resources for SDT.
UE enters RRC_INACTIVE.
If criteria to enter RRC_IDLE is met while UE is RRC_INACTIVE,
UE releases the CG resources configured for SDT.
If criteria to enter RRC_IDLE is met,
UE receives RRCSetup message from gNB
UE receives RRCRelease without suspend indication from gNB
cell reselection occurs Embodiment 3—SDT Timer Operation Embodiment 3-1: One SDT timer is configured by gNB for SDT operation. Timer value can be configured using RRC signaling. The SDT timer is started when SDT procedure is initiated or upon the first UL transmission of SDT procedure. During the SDT procedure, if UE receives PDCCH addressed to UE's radio network temporary identifier (RNTI) indicating UL grant for new transmission, SDT timer is re-started.

In an embodiment, if UE receives PDCCH addressed to UE's RNTI indicating DL grant for new transmission, during the SDT procedure, SDT timer is re-started.

In an embodiment, if UE receives PDCCH addressed to UE's RNTI indicating UL grant (new transmission or retransmission), during the SDT procedure, SDT timer is re-started.

In an embodiment, if UE receives PDCCH addressed to UE's RNTI indicating UL grant or DL transport block (TB), during the SDT procedure, SDT timer is re-started.

In an embodiment, if UE transmits an UL MAC PDU and/or receives DL MAC PDU, during the SDT procedure, SDT timer is re-started. In an embodiment, if UE transmits an UL MAC PDU and/or receives DL MAC PDU, other than MsgA/MsgB/Msg2/Msg3/Msg4 MAC PDUs, during the SDT procedure, SDT timer is re-started.

UE's RNTI can be RNTI configured for SDT or RNTI received in RAR or C-RNTI or TC-RNTI. In an embodiment, UE's RNTI can also be RA-RNTI or MsgB-RNTI.

Embodiment 3-2: Two SDT timers are configured by gNB for SDT operation. Timer value can be configured using RRC signaling.

The first SDT timer (or T319) is started when SDT procedure is initiated. This timer is stopped when RA procedure initiated for SDT is completed or for CG based SDT procedure first UL transmission in CG resources is successfully transmitted (or HARQ ACK is received for first UL transmission in CG resource during SDT procedure).

The second timer is started when RA procedure initiated for SDT is completed or for CG based SDT procedure first UL transmission in CG resources is successfully transmitted (or HARQ ACK is received for first UL transmission in CG resource during SDT procedure). Alternately, this second timer is (re)started for every UL and/or DL transmission after RA procedure initiated for SDT is completed or for CG based SDT procedure after the first UL transmission in CG resources is successfully transmitted (or HARQ ACK is received for first UL transmission in CG resource during SDT procedure). Alternately, this second timer is (re)started for every UL and/or DL transmission during the SDT procedure.

On expiry of second timer, SDT procedure is terminated but considered successfully completed. On expiry of first timer, SDT procedure is considered failed and terminated.

Embodiment 4—TAT Handling for RACH based SDT

UE is in RRC_INACTIVE. Criteria to perform RACH based SDT is met. In case of SDT based on 4 step RA, during the SDT procedure, UE transmits RA preamble on physical random access channel (PRACH) and receives RAR from gNB. Upon receiving RAR corresponding to UE's transmitted RA preamble, UE starts time alignment timer (TAT). Upon receiving RAR corresponding to UE's transmitted RA preamble, UE starts TAT (or, TAT timer) Similarly, in case of SDT based on 2 step RA, during the SDT procedure, UE transmits RA preamble on PRACH, transmits MsgA payload on PUSCH, and receives fallbackRAR or successRAR from gNB and UE starts TAT timer.

Later, the SDT procedure can be successfully completed upon receiving RRC Release message from gNB. If TAT timer continue to run upon completion of SDT procedure, it may affect the TAT operation for subsequent connection resume/SDT procedure as the timer will not get started when TA value is received from gNB for subsequent connection resume/SDT procedure, because TAT is started only if it is not running. So it is proposed that TAT timer is stopped upon completion of SDT procedure (e.g. if UE receives RRC release message during the SDT procedure or SDT timer is expired or SDT procedure is failed or terminated).

It is possible that while SDT procedure is ongoing, TAT timer may expire.

In this case one of the following operations can be performed

Option 1: UE terminates the ongoing SDT procedure

Option 2: UE does not terminates the ongoing SDT procedure. UE suspends the UL transmission (except Random Access Preamble and MSGA transmission). UE waits for PDCCH order from gNB. Upon receiving PDCCH order, UE initiates the RACH and TAT timer will get re-started. Note that UE will transmit C-RNTI MAC CE in MsgA or Msg3 to gNB in this case even though UE is in RRC INACTIVE. C-RNTI MAC control element (CE) will include the C-RNTI being used by UE for SDT procedure (i.e. the one which is received by UE during the RACH initiated for SDT). RACH configuration used by UE for this RACH initiated by PDCCH order will be the non-SDT RACH configuration (or Alternately, it can be SDT RACH configuration). Whether to use SDT or non-SDT RACH configuration can be indicated in PDCCH order or system information (SI) or it can be pre-defined. In an embodiment, SDT timer can be stopped on TAT expiry during SDT procedure.

Option 3: UE does not terminate the ongoing SDT procedure. UE suspends the UL transmission (except Random Access Preamble and MSGA transmission). UE initiates RACH (or UE initiates RACH if scheduling request is triggered). Note that UE will transmit C-RNTI MAC CE in MsgA or Msg3 to gNB in this case even though UE is in RRC_INACTIVE. C-RNTI MAC CE will include the C-RNTI being used by UE for SDT procedure (i.e. the one which is received by UE during the RACH initiated for SDT). RACH configuration used by UE for this RACH initiated by PDCCH order will be the non-SDT RACH configuration (or Alternately, it can be SDT RACH configuration). Whether to use SDT or non-SDT RACH configuration upon TAT expiry during SDT procedure can be indicated in SI or it can be pre-defined. In an embodiment, SDT timer can be stopped on TAT expiry during SDT procedure.

Embodiment 5—PDCP Status Report handling for SDT

According to current procedure, if upper layer (i.e. RRC) requests a PDCP entity re-establishment for an acknowledged mode (AM) DRB and statusReportRequired is configured in PDCP configuration of that DRB: PDCP entity triggers a PDCP status report.

For small data transmission in RRC_INACTIVE, PDCP entity of one or more AM DRB(s) for which small data transmission is enabled, are re-established when SDT procedure is initiated. The consequence is that based on existing procedure PDCP status report will be generated even if there is no status to be reported. This will unnecessarily increase the overhead.

In an embodiment of this disclosure the UE operation is as follows:
If upper layer (i.e. RRC) requests a PDCP entity re-establishment for an AM DRB and if statusReportRequired is configured in PDCP configuration of that DRB:
  if PDCP entity re-establishment is not triggered for small data transmission:
    PDCP entity triggers a PDCP status report
If upper layer (i.e. RRC) requests a PDCP entity re-establishment for an AM DRB and if statusReportRequired is configured in PDCP configuration of that DRB:
  if PDCP entity re-establishment is triggered for small data transmission:
    PDCP entity does not trigger a PDCP status report
  Else
    PDCP entity triggers a PDCP status report In another embodiment, if PDCP entity re-establishment of an AM DRB is triggered for small data transmission, statusReportRequired is considered as not configured (irrespective of statusReportRequired configuration in PDCP configuration).

Embodiment 6—BFR Handling Aspects

According to current procedure, upon beam failure detection (BFD), beam failure recovery (BFR) is triggered upon complete evaluation of all the candidate beams. This may delay BFR even if UE has found a suitable candidate beam during the candidate beam evaluation process.

According to an embodiment of the disclosure, The UE is allowed to report S cell as failed before completion of candidate beam evaluation phase, if UE has found a suitable candidate beam during the evaluation process.

The MAC entity shall:
1>if the Beam Failure Recovery procedure determines that at least one BFR has been triggered and not cancelled for an S cell for which at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available or evaluation of the candidate beams according to the requirements has been completed:

2>if uplink shared channel (UL-SCH) resources are available for a new transmission and if the UL-SCH resources can accommodate the BFR MAC CE plus its subheader as a result of logical channel prioritization (LCP):
  3>instruct the Multiplexing and Assembly procedure to generate the BFR MAC CE.
2>else if UL-SCH resources are available for a new transmission and if the UL-SCH resources can accommodate the Truncated BFR MAC CE plus its subheader as a result of LCP:
  3>instruct the Multiplexing and Assembly procedure to generate the Truncated BFR MAC CE.
2>else:
  3>trigger the scheduling request (SR) for Scell beam failure recovery for each S cell for which BFR has been triggered and not cancelled for an Scell for which at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available or evaluation of the candidate beams according to the requirements has been completed.

The MAC Ces for BFR consists of either:
BFR MAC CE; or
Truncated BFR MAC CE.

The BFR MAC CE and Truncated BFR MAC CE are identified by a MAC subheader with logical channel identifier (LCID)/enhanced LCID (eLCID).

The BFR MAC CE and Truncated BFR MAC CE have a variable size. They include a bitmap and in ascending order based on the ServCellIndex, beam failure recovery information i.e. octets containing candidate beam availability indication (AC) for Scells indicated in the bitmap. For BFR MAC CE, a single octet bitmap is used when the highest ServCellIndex of this MAC entity's Scell for which beam failure is detected and either the evaluation of the candidate beams according to the requirements has been completed or at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available, is less than 8, otherwise four octets are used. A MAC PDU shall contain at most one BFR MAC CE.

For Truncated BFR MAC CE, a single octet bitmap is used for the following cases, otherwise four octets are used:
  the highest ServCellIndex of this MAC entity's Scell for which beam failure is detected and either the evaluation of the candidate beams according to the requirements has been completed or at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available, is less than 8; or
  beam failure is detected for SpCell and the SpCell is to be indicated in a Truncated BFR MAC CE and the UL-SCH resources available for transmission cannot accommodate the Truncated BFR MAC CE with the four octets bitmap plus its subheader as a result of LCP.

The fields in the BFR MAC Ces are defined as follows:
SP: This field indicates beam failure detection for the SpCell of this MAC entity. The SP field is set to 1 to indicate that beam failure is detected for SpCell only when BFR MAC CE or Truncated BFR MAC CE is to be included into a MAC PDU as part of Random Access Procedure, otherwise, it is set to 0;

Ci (BFR MAC CE): This field indicates beam failure detection and the presence of an octet containing the AC field for the Scell with ServCellIndex i. The Ci field set to 1 indicates that beam failure is detected, either the evaluation of the candidate beams according to the requirements has been completed or at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available, and the octet containing the AC field is present for the Scell with ServCellIndex i. The Ci field set to 0 indicates that the beam failure is either not detected or the beam failure is detected but the evaluation of the candidate beams according to the requirements has not been completed, and the octet containing the AC field is not present for the Scell with ServCellIndex i. The octets containing the AC field are present in ascending order based on the ServCellIndex;

Ci (Truncated BFR MAC CE): This field indicates beam failure detection for the Scell with ServCellIndex i. The Ci field set to 1 indicates that beam failure is detected, either the evaluation of the candidate beams according to the requirements has been completed or at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available, and the octet containing the AC field for the Scell with ServCellIndex i may be present. The Ci field set to 0 indicates that the beam failure is either not detected or the beam failure is detected but the evaluation of the candidate beams according to the requirements has not been completed, and the octet containing the AC field is not present for the Scell with ServCellIndex i. The octets containing the AC field, if present, are included in ascending order based on the ServCellIndex. The number of octets containing the AC field included is maximized, while not exceeding the available grant size.

Embodiment 7—non terrestrial network (NTN) Aspects

RAN2 working assumption (for RRC idle): Rel-17 UE with pre-compensation capability obtains UE specific UE-gNB round trip time (RTT) based on its global network satellite system (GNSS) in low earth orbit (LEO)/geostationary earth orbit (GEO). How this is calculated and what/if anything needs to be broadcasted for the different pre-compensation methods (e.g. common timing alignment (TA)) to help the UE to obtain the full UE-gNB RTT need to be determined.

If the UE-gNB RTT is pre-compensated, preamble ambiguity is not an issue in Rel-17 NTN. Thus, how and by whom the possibly multiple components of UE-gNB RTT are pre-compensated need to be determined.

From RAN2 perspective, for UE with UE-specific pre-compensation as a baseline, it is up to gNB implementation to ensure sufficient time on UE side for the Msg3 transmission.

For UE with pre-compensation capability (at least for the HARQ-feedback enabled case), drx-HARQ-RTT-TimerDL is offset by UE-specific RTT (UE-gNB delay) in LEO/GEO. So, if offset is applied to: 1) the start of the timers or 2) the timer value range (i.e. existing values within value range increased by offset) needs to be further determined.

Here, how to support Ues with/without pre-compensation capability is proposed with 2 different embodiments.
RACH configuration:
Configure a first and second RACH configuration for NTN. Configuration is signaled by gNB.
First RACH configuration is for UE supporting pre-compensation.
Second RACH configuration is for UE not supporting pre-compensation.
Explicit/implicit indication whether RACH configuration is for UE supporting pre-compensation or for UE supporting pre-compensation can be signaled.
Preamble+RO combination between first and second RACH configuration is different.
UE apply first or second RACH configuration depending on whether it supports pre-compensation or not.
RAR
Common RAR MAC SDU format with large TA field size.
(Alt) Different RAR MAC SDU formats, one with large TA field size and another with small TA field size.
In this case, gNB will use format with small TA field size for UE supporting pre-compensation.
RAR search space can be same or different for both the configurations.

Table 1 below provide the UE operation depending on UE capability and network configuration.

TABLE 1

|  | Current active BWP supports only "non-pre-com" RACH | Current active BWP supports only "pre-com" RACH | Current active BWP supports both |
| --- | --- | --- | --- |
| UE does not support pre-compensation | Non-pre-compensation operation (i.e. pre-compensation is not applied) | Barring the cell | Choose non-pre-compensation and apply non-pre-compensation operation |
| UE support pre-compensation | Non-pre-compensation operation | Pre-compensation operation | Choose pre-compensation and apply pre-compensation operation |

No pre-compensation means UE may apply common TA value or TA is zero. Pre compensation means UE may apply UE specific TA value wherein UE specific TA value is estimated based on UE specific UE-gNB RTT.

Figure 6:
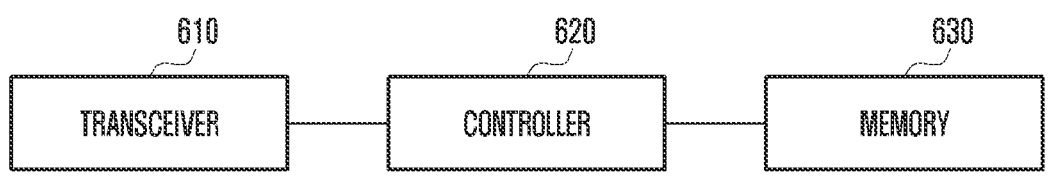
FIG. 6 is a block diagram of a terminal according to an embodiment of the disclosure.

FIG. 6 is a block diagram of a terminal according to an embodiment of the disclosure.

Referring to FIG. 6, a terminal includes a transceiver 610, a controller 620 and a memory 630. The controller 620 may refer to a circuitry, an application-specific integrated circuit (ASIC), or at least one processor. The transceiver 610, the controller 620 and the memory 630 are configured to perform the operations of the terminal (e.g., UE) illustrated in the figures, e.g. FIGS. 1 to 5, or described above. Although the transceiver 610, the controller 620 and the memory 630 are shown as separate entities, they may be realized as a single entity like a single chip. Or, the transceiver 610, the controller 620 and the memory 630 may be electrically connected to or coupled with each other.

The transceiver 610 may transmit and receive signals to and from other network entities, e.g., a base station.

The controller 620 may control the UE to perform functions according to one of the embodiments described above. For example, the controller 620 controls the UE to receive CG resource related information from the base station and manage (or, handle) the CG resources in accordance with an RRC state of the UE as well as SDT procedure criteria.

In an embodiment, the operations of the terminal may be implemented using the memory 630 storing corresponding program codes. Specifically, the terminal may be equipped with the memory 630 to store program codes implementing desired operations. To perform the desired operations, the controller 620 may read and execute the program codes stored in the memory 630 by using a processor or a central processing unit (CPU).

Figure 7:
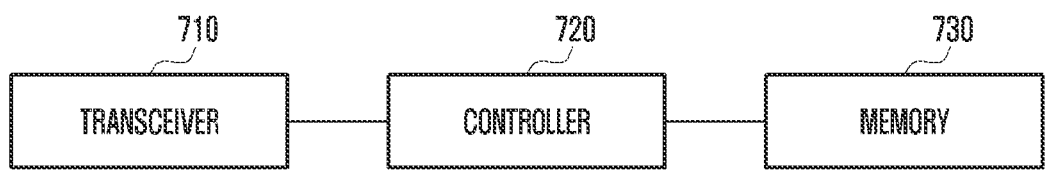
FIG. 7 is a block diagram of a base station according to an embodiment of the disclosure.

FIG. 7 is a block diagram of a base station according to an embodiment of the disclosure.

Referring to FIG. 7, a base station includes a transceiver 710, a controller 720 and a memory 730. The transceiver 710, the controller 720 and the memory 730 are configured to perform the operations of the network (e.g., gNB) illustrated in the figures, e.g. FIGS. 1 to 5, or described above. Although the transceiver 710, the controller 720 and the memory 730 are shown as separate entities, they may be realized as a single entity like a single chip. The transceiver 710, the controller 720 and the memory 730 may be electrically connected to or coupled with each other.

The transceiver 710 may transmit and receive signals to and from other network entities, e.g., a terminal.

The controller 720 may control the base station to perform functions according to one of the embodiments described above. For example, the controller 720 controls the base station to transmit RRC state related information to the UE perform transmission and/or reception of SDT procedure related message(s), and transmit CG resource related information to the UE.

The controller 720 may refer to a circuitry, an ASIC, or at least one processor. In an embodiment, the operations of the base station may be implemented using the memory 730 storing corresponding program codes. Specifically, the base station may be equipped with the memory 730 to store program codes implementing desired operations. To perform the desired operations, the controller 720 may read and execute the program codes stored in the memory 730 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
 receiving, from a base station, a first radio resource control (RRC) release message including information related to a suspend configuration and information related to a configured grant (CG) configuration for a small data transmission (SDT);
 performing an SDT procedure based on the information related to the CG configuration for the SDT while the terminal is in an RRC inactive;
 receiving, from the base station, a second RRC release message without the information related to the suspend configuration; and
 releasing the CG configuration for the SDT based on the second RRC release message without the information related to the suspend configuration while the terminal is in an RRC idle state.

2. The method of claim 1, wherein the CG configuration for the SDT is released based on an integrity check failure.

3. The method of claim 1, wherein the CG configuration for the SDT is released based on a cell reselection.

4. The method of claim 1,
 wherein a timer for a time alignment is stopped while the terminal is in the RRC idle state, and
 wherein the terminal enters the RRC idle state based on the second RRC release message without the information related to the suspend configuration or a timer configured for the SDT expires.

5. The method of claim 1, wherein in case that the SDT procedure is performed based on a resume procedure, a packet data convergence protocol (PDCP) entity is re-established for the SDT without triggering a PDCP status report.

6. A method performed by a base station in a wireless communication system, the method comprising:
 transmitting, to a terminal, a first radio resource control (RRC) release message including information related to a suspend configuration configuring an RRC inactive state for the terminal and information related to a configured grant (CG) resource configuration for a small data transmission (SDT);
 receiving, from the terminal in the RRC inactive state, first-uplink data of the SDT based on the information related to the CG configuration for the SDT; and
 transmitting, to the terminal, a second RRC release message without the information related to the suspend configuration,
 wherein the CG configuration for the SDT is released based on the second RRC release message without the information related to the suspend configuration while the terminal is in an RRC idle state.

7. The method of claim 6, wherein the CG configuration for the SDT is released based on an integrity check failure.

8. The method of claim 6, wherein the CG configuration for the SDT is released based on a cell reselection.

9. The method of claim 6,
 wherein a timer for a time alignment is stopped while the terminal is in the RRC idle state, and
 wherein the terminal enters the RRC idle state based on the second RRC release message without the information related to the suspend configuration or a timer configured for the SDT expires.

10. The method of claim 6, wherein in case that an SDT procedure is performed based on a resume procedure, a packet data convergence protocol (PDCP) entity is re-established for the SDT without triggering a PDCP status report.

11. A terminal in a wireless communication system, the terminal comprising:
 a transceiver; and
 a controller coupled with the transceiver and configured to:
 receive, from a base station, a first radio resource control (RRC) release message including information related to a suspend configuration and information related to a configured grant (CG) configuration for a small data transmission (SDT),
 perform an SDT procedure based on the information related to the CG configuration for the SDT while the terminal is in an RRC inactive state,
 receive, from the base station, a second RRC release message without the information related to the suspend configuration, and release the CG configuration for the SDT based on the second RRC release message without the information related to the suspend configuration while the terminal is in an RRC idle state.

12. The terminal of claim 11, wherein the CG configuration for the SDT is released based on an integrity check failure.

13. The terminal of claim 11, wherein the CG configuration for the SDT is released based on a cell reselection.

14. The terminal of claim 11,
wherein a timer for a time alignment is stopped while the terminal is in the RRC idle state, and
wherein the terminal enters the RRC idle state based on the second RRC release message without the information related to the suspend configuration or a timer configured for the SDT expires.

15. The terminal of claim 11, wherein in case that the SDT procedure is performed based on a resume procedure, a packet data convergence protocol (PDCP) entity is re-established for the SDT without triggering a PDCP status report.

16. A base station in a wireless communication system, the base station comprising:
a transceiver; and
a controller coupled with the transceiver and configured to:
transmit, to a terminal, a first radio resource control (RRC) release message including information related to a suspend configuration configuring an RRC inactive state for the terminal and information related to a configured grant (CG) resource configuration for a small data transmission (SDT),
receive, from the terminal in the RRC inactive state, first uplink data of the SDT based on the information related to the CG configuration for the SDT, and
transmit, to the terminal, a second RRC release message without the information related to the suspend configuration,
wherein the CG configuration for the SDT is released based on the second RRC release message without the information related to the suspend configuration while the terminal is in an RRC idle state.

17. The base station of claim 16, wherein the CG configuration for the SDT is released based on an integrity check failure.

18. The base station of claim 16, wherein the CG configuration for the SDT is released based on a cell reselection.

19. The base station of claim 16,
wherein a timer for a time alignment is stopped while the terminal is in the RRC idle state, and
wherein the terminal enters the RRC idle state based on the second RRC release message without the information related to the suspend configuration or a timer configured for the SDT expires.

20. The base station of claim 16, wherein in case that an SDT procedure is performed based on a resume procedure, a packet data convergence protocol (PDCP) entity is re-established for the SDT without triggering a PDCP status report.

* * * * *